INVENTOR
CHARLES L. McCARTHY, JR.

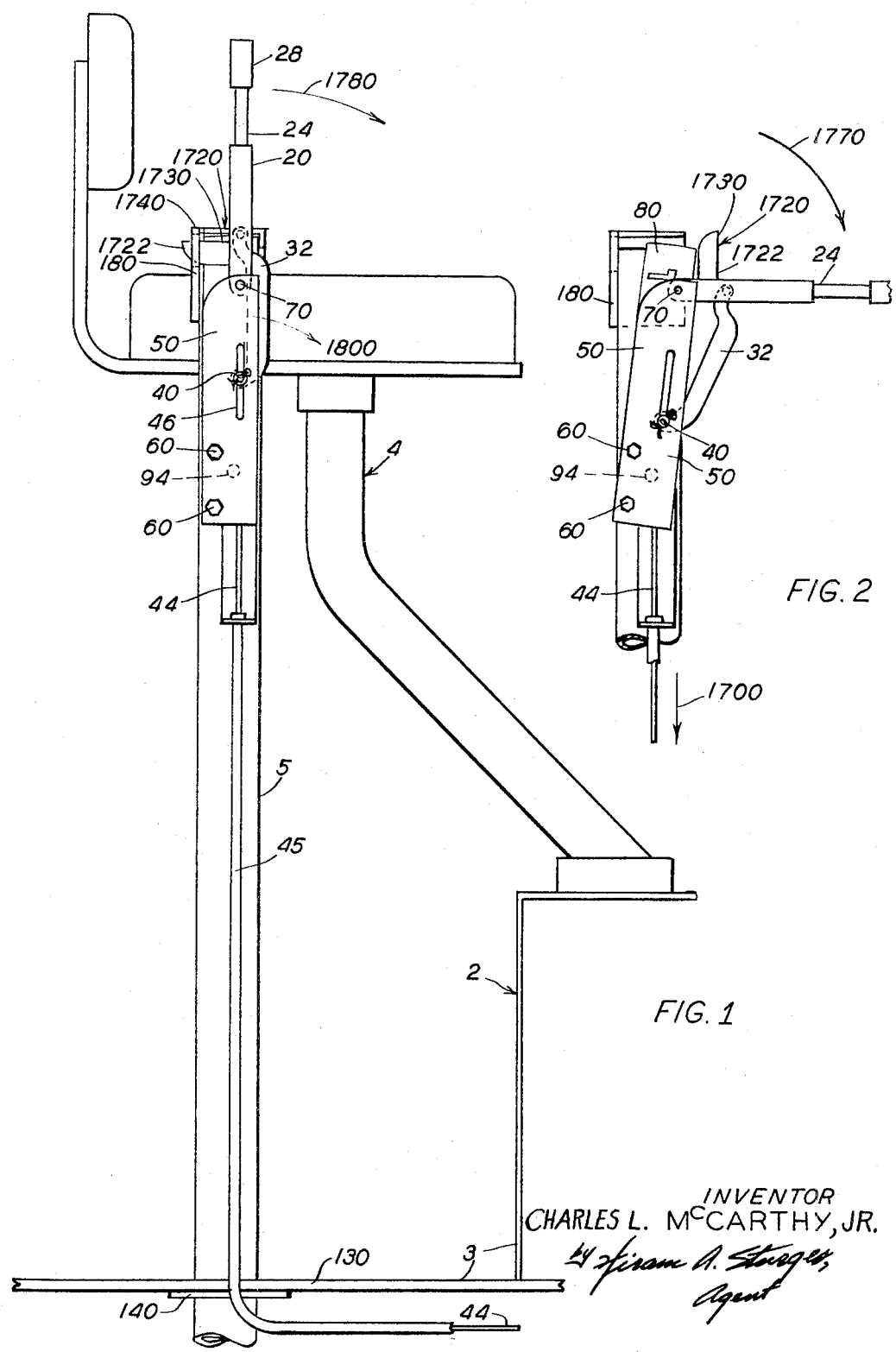

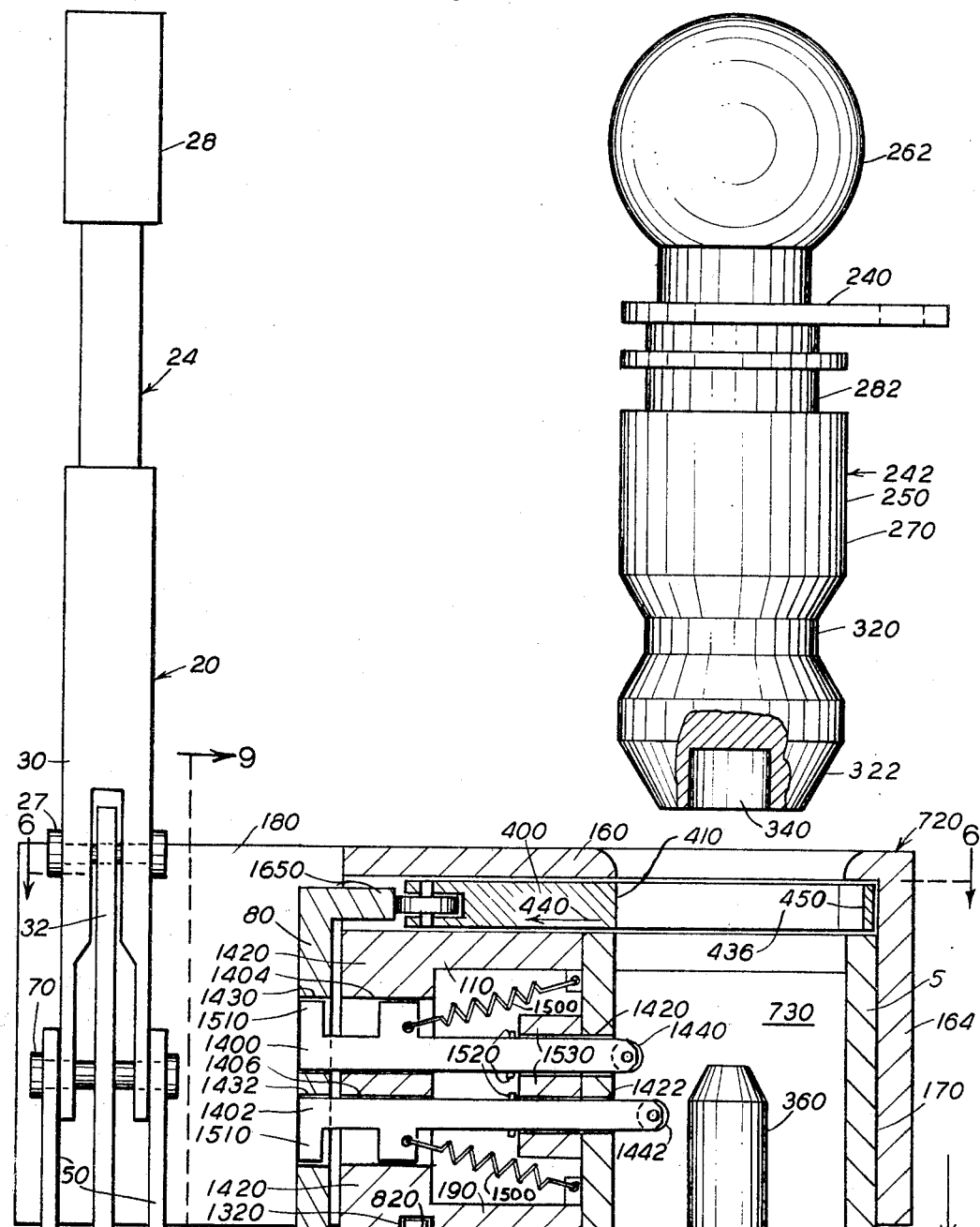

Aug. 30, 1966      C. L. McCARTHY, JR      3,269,482
                    SAFETY BELT LOCK

Filed July 20, 1964                    6 Sheets-Sheet 6

INVENTOR.
CHARLES L. McCARTHY, JR.
BY
Agent

United States Patent Office 3,269,482
Patented August 30, 1966

3,269,482
SAFETY BELT LOCK
Charles L. McCarthy, Jr., 8529 Parker St.,
Omaha, Nebr.
Filed July 20, 1964, Ser. No. 383,721
2 Claims. (Cl. 180—82)

This invention relates to safety belts, and more particularly it is an object of this invention to provide a safety belt for use on short-stop vehicles such as delivery trucks and taxicabs.

Milk trucks and delivery trucks have open doorways so that the driver can get in and out quickly. Frequently drivers are thrown out of the truck and often the truck falls on the driver crushing his head and body.

Such trucks are top-heavy because they are designed so that an operator can stand up in them. Their drivers' seats are without arms and have only a small back, to the end that they are better described by the word "stool." There is almost nothing to hold the driver in the truck against a violent force, except his ability to cling to the steering wheel. Too often this is not enough.

Seat belts of the types used on passenger cars are unsuitable for delivery trucks because of the nuisance of buckling and unbuckling involved in such frequent entering and leaving of such trucks. For these reasons, the serious accidents have been frequent.

Operators falling out through the door of their own truck are quite often hit, either by their own trucks, or by another vehicle and are without the protection provided by the closed doors of a passenger car.

It is therefore, an object of this invention to provide a safety belt to be continuously worn by the driver, even at times when he is not in the truck, with a quickly attached connection between the safety belt locking device, being available and also readily releasable to make possible its use with a minimum of inconvenience.

Still another object is to make it possible for companies owning truck fleets and for insurance companies insuring the truck fleets to be assured that operators are actually using the safety belts, this being accomplished by means of mechanical interconnection between the safety belt locking device and the emergency brake of the truck whereby the brake cannot be released to allow the truck to be freely operated until connection has been made between the safety belt and the locking device thereby assuring that the operator is securely held from being thrown out the open door.

In order to insure that the emergency brake will be on and requiring release, it is an object to construct the locking mechanism in a way so that it is impossible for an operator to release his safety belt from the mechanism without first setting the emergency brake, thereby preventing the truck from being moved.

The application of the emergency brake then automatically frees the operator so that he can leave the stopped truck.

More particularly it is an object of this invention to provide for the attachment of the operator's safety belt to the locking mechanism by means of a pin inserted in a socket in the locking mechanism, the pin also serving as a key. Just as a key releases a lock to be opened, in like manner, my pin releases the emergency brake.

A particular object is to provide a device for this purpose which can operate as automatically as possible. Delivery truck drivers often receive their pay in accordance with the number of stops they are able to complete. They have a high incentive to complete as many stops as possible and any safety mechanism which would unduly interfere with the speed of their deliveries would likely not be used, hence automatic, quick operation is vital.

In the drawings:

FIGURE 1 is a side elevation of a typical delivery truck operator's seat and emergency brake assembly, with certain adjacent portions of the truck floor being shown and with the brake in an upward or brake set position.

FIGURE 2 shows the emergency brake assembly portion of FIGURE 1, but with the brake in a brake released position.

FIGURE 3 shows an upper portion of the brake assembly of FIGURE 1 shown with a lock assembly of this invention mounted thereon, the view also showing a key or securing pin of the invention in a position preparatory to insertion in the locking mechanism, and the locking mechanism and brake parts being shown in a brake set position.

Figure 4:
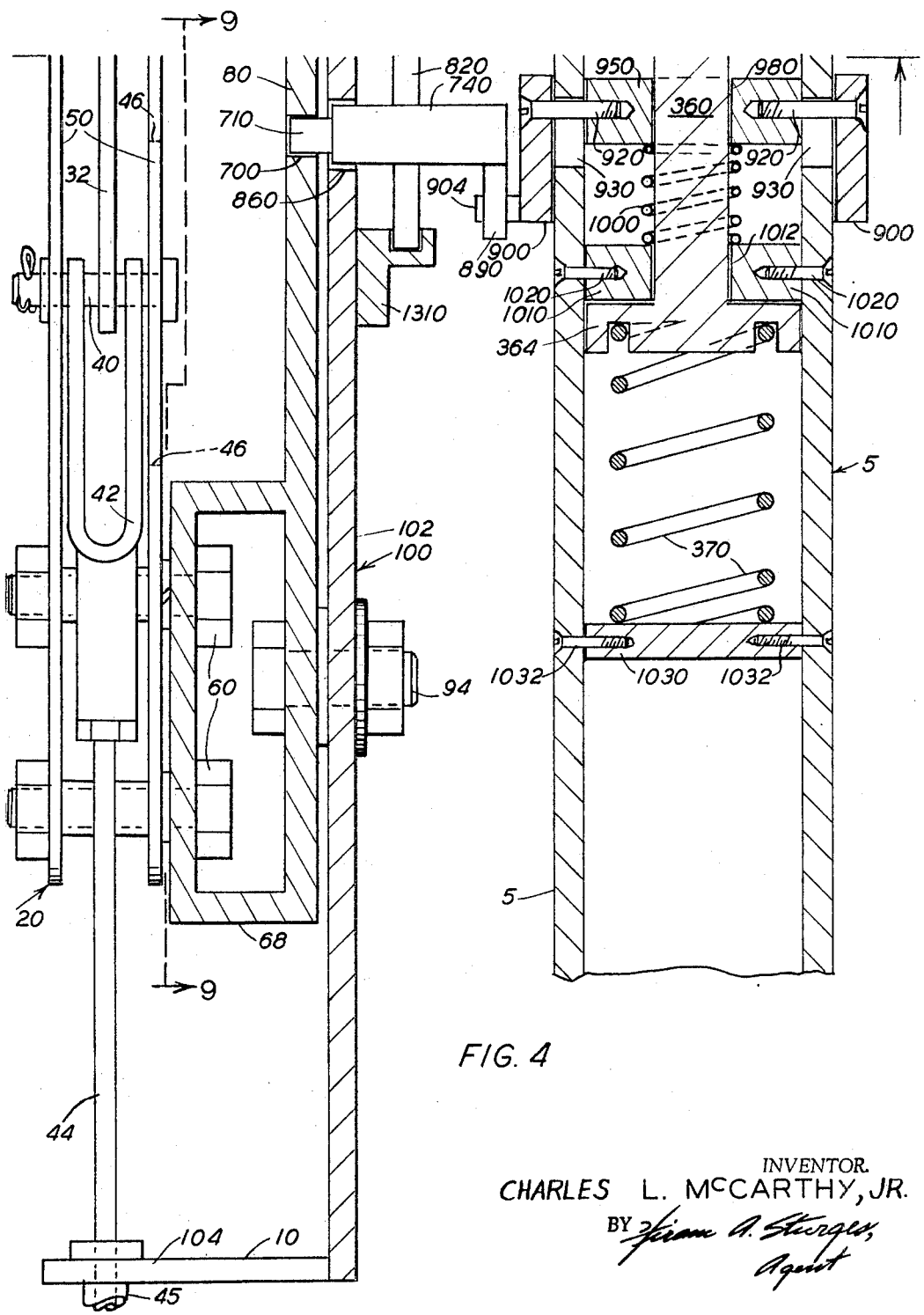
FIGURE 4 shows a lower portion of the lock assembly of FIGURE 1 with parts in the brake set position.
Figure 6:
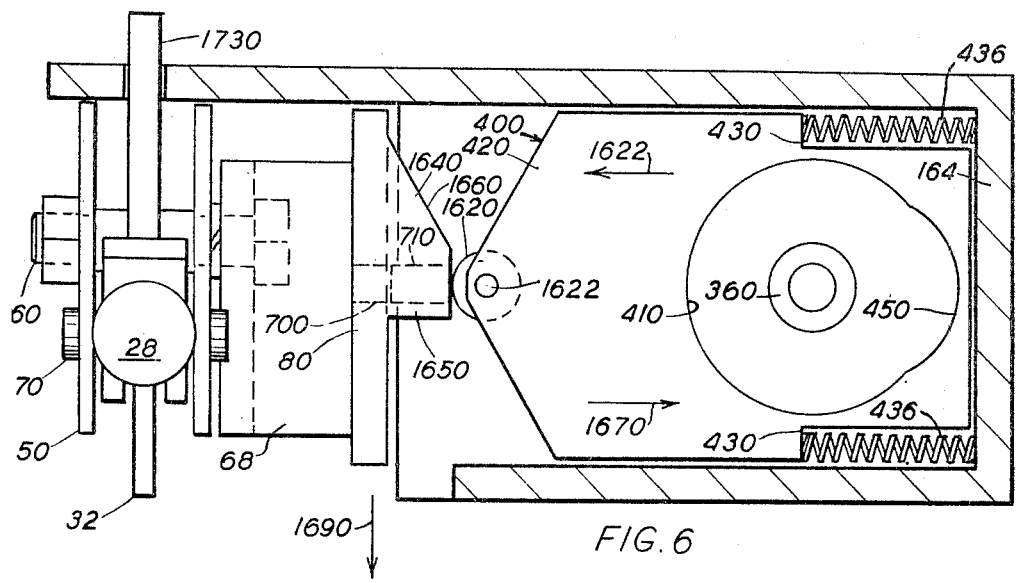

FIGURE 6 is a detail showing a horizontal motion forcing assembly of this invention shown as seen along the line 6—6 of FIGURE 4, the view also showing such parts of a conventional emergency brake such as is associated therewith. The full lines show parts in a position representing the end of a period of partially horizontal motion of certain later described mounting members, right hand dotted lines showing the position of parts during set position of emergency brake, left hand dotted lines showing position of certain parts at the time the emergency brake is in a fully released position.

Figure 7:
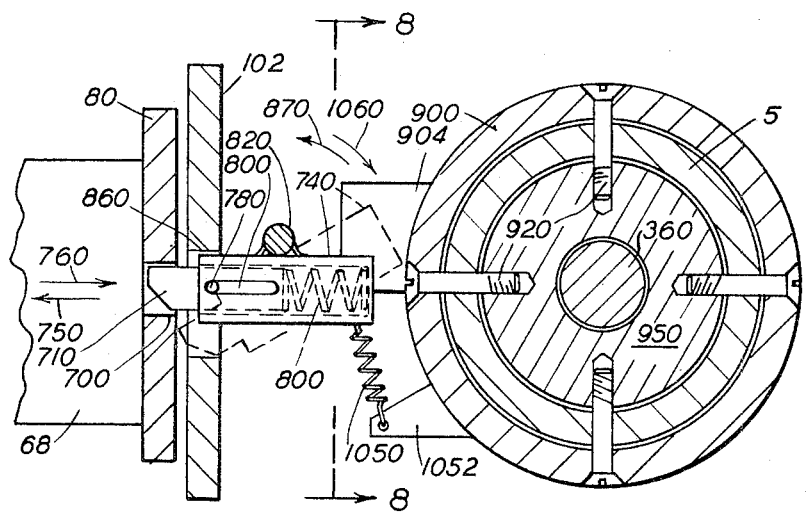

FIGURE 7 shows a pivotal lock dog and lock dog housing.

Figure 8:
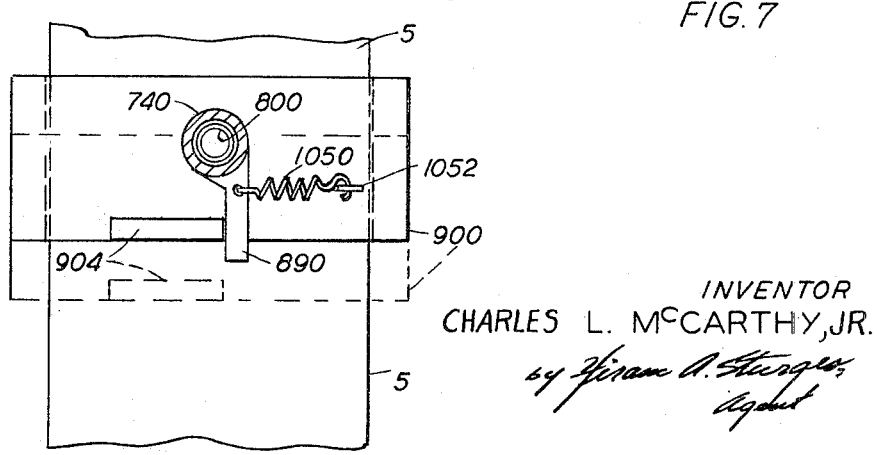

FIGURE 8 is a sectional view taken along the line 8—8 of FIGURE 7.

Figure 9:
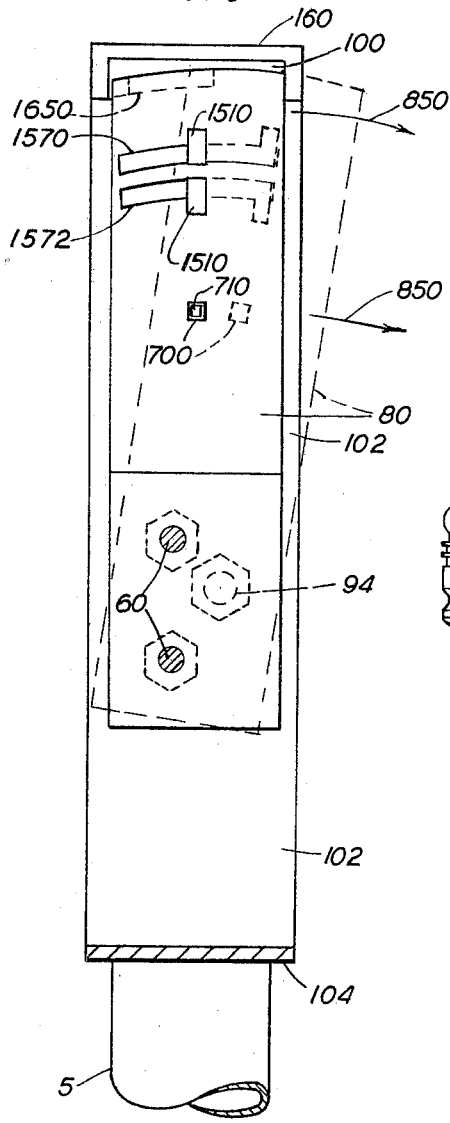

FIGURE 9 is an elevational view of a locking plate taken along the line 9—9 of FIGURE 4.

Figure 10:
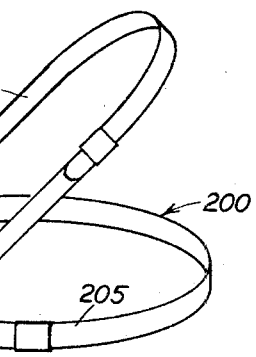

FIGURE 10 shows the safety belt and securing pin.

Figure 5:
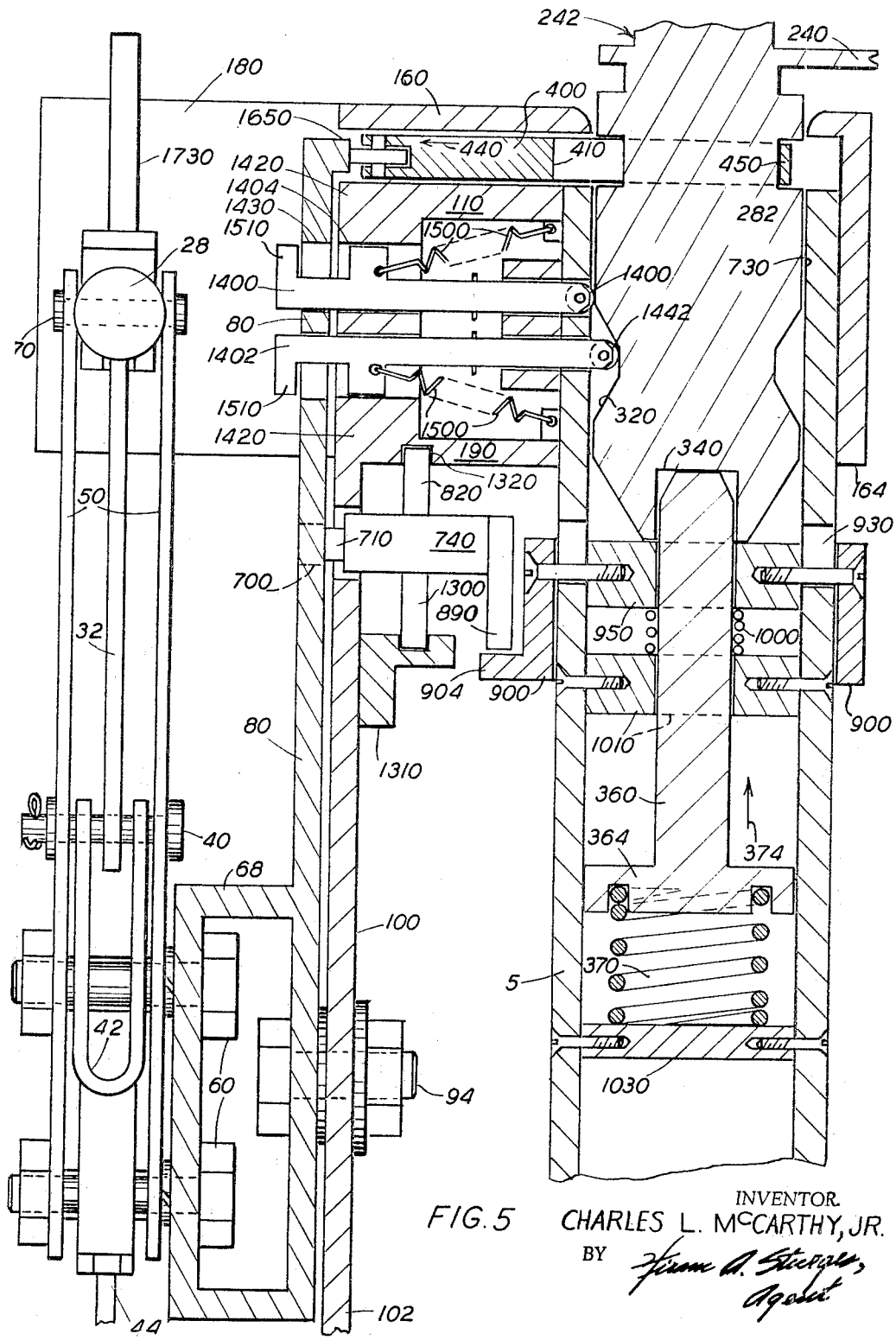
FIGURE 5 is a frontal elevation of the brake mechanism shown in brake released position with the locking mechanism of this invention attached thereto and showing the key or securing pin in an inserted position and the locking mechanism in a brake released position, upper portions of the key and lower portions of the brake and lock mechanisms being broken away.

Referring to the drawings for a more detailed description, the safety mechanism of this invention is best seen in FIGURES 3 and 5 in which an emergency or hand brake is generally indicated at 20.

The brake 20 is best seen in its relationship to other parts of a delivery vehicle in FIGURE 1 in which the delivery vehicle is generally indicated at 2, having a floor 3, a driver's or operator's seat assembly 4 and a brake post 5.

Brakes of the type shown at 20 are in very common use on delivery vehicles and have a hand lever 24 having a rotating upper portion 28 which latter is adapted in its rotation to move a pivot pin 27 upwardly and downwardly with respect to a bifurcated member 30, by mechanism not shown because it is conventional. A member 30 is attached to a toggle link 32 at a pivot pin 27, the link 32 being connected by a pin 40 at its lower end to a cable connection member 42 which is provided with a lower end fixed to a cable 44, passing through a housing 45, seen in FIGURE 1.

The bolt 40 moves upwardly and downwardly in slots 46 in mounting members 50, which latter are disposed in spaced apart positions for receiving the cable connection member 42 therebetween.

The lower ends of the mounting members 50 are secured by bolts 60 to a bracket 68.

Referring to FIGURE 4, the brake is there shown in a braking position with the cable 44 under tension from the toggle mechanism of the brake, and with the handle 24 vertical.

In FIGURE 2 a portion of the handle 24 is shown in the horizontal position, and since the handle pivots about a bolt 70 extending through the mounting members 50, the horizontal position of the handle 24 as shown in FIGURE 2 illustrates the brake release position in which latter position the cable 44 of FIGURE 1 would be relaxed.

As best seen in FIGURES 4 and 5, the bracket 68 is fixed to a locking plate 80. All parts of the mechanism of this invention are indirectly locked to the plate 80.

Referring to FIGURE 4, the locking plate 80 is pivotally secured by a bolt 94 to a main frame piece 100, the bolt 94 providing a horizontal axis of rotation disposed in general parallelism to the bolt 40 and to the bolt 70 earlier mentioned.

The main frame piece 100 can be seen in FIGURE 4 to have a vertical portion 102 and a horizontal lower portion 104. The upper end of the main frame piece or plate 100 is fixed to a lower pin hole plate 110, which latter extends horizontally around the top of and is attached to a supporting post 5, best seen in FIGURES 3 and 4.

The supporting post 5 is annular and has its lower end absent in FIGURE 4. However, the lower end of the pipe or post 5 is best seen in FIGURE 1 and will be seen to extend through a portion 130 of the floor 3 of a delivery truck and down to and through a post attachment plate 140, which latter, as best seen in FIGURE 1, is suitably attached to the truck 2.

Referring to FIGURE 3, above and spaced from the lower pin hole plate 110 is a horizontal upper pin hole plate 160, which latter has at its right end a downwardly extending portion 164, which latter is welded to the post 5 along the side of the post at 170.

The upper pin hole plate 160 is welded along its rear side to a vertical brake-hold plate 180, which latter extends along the back side of the post 5 and is welded thereto, the plate 180 also being welded to the back side of the main frame member 100, to form a strong construction.

A web 190 can be seen in FIGURE 3 extending between the post 120 and the main frame member 100 and welded to each of the latter.

Referring to FIGURE 7, a safety belt 200 is there shown which is provided with a shoulder strap 210. The belt and shoulder strap are preferably made of nylon webbing having a fluorescent color so as to be especially easily seen, because many accidents occur when a driver is leaving or entering his truck and it is much the best if he is visible to other motorists.

A U-shaped member 220 is fixed around the belt 200, as best shown in FIGURE 7 and the lower ends of the member 220 are provided with openings 224 through which an end link 230 of a chain 232 is disposed, the chain 232 having its other end link extending through an opening 236 in an attachment member 240 of a pin or pin assembly generally indicated 242, as best seen in detail in FIGURE 3.

The pin or key assembly 242 has an outer jacket 250 and has a knob 262 attached at its upper end and an attachment portion 240 extending horizontally therefrom.

Around an intermediate portion 270 of the outer jacket 250 is a circular annular recess 320, which latter can also be called a tumbler aligning recess 320, for a purpose later described. The lower end of the pin assembly 242 is inwardly and downwardly beveled on all sides at 322.

Referring to FIGURE 5, the parts are there shown in a key-inserted or a pin-inserted position, in which the pin 242 is shown with a recess 340 in its lower end receiving the upper end of an extraction plunger 360, which latter is vertically movable and has a lower end which is horizontally enlarged as shown at 364 and which receives a spring 370 in a recess 372 in the lower end for urging the extraction plunger 360 upwardly in the direction of the arrow 374.

As the parts are shown in the pin-inserted position of FIGURE 5, it will be seen that the pin extraction plunger 360 is ready to urge the pin 242 upwardly and outwardly whenever other parts permit this.

Referring again to FIGURE 5, a latch plate is there shown at 400 which has a vertical opening therethrough at 410 whereby a main portion 420 of the latch plate 400 is solid.

On the right hand side of FIGURE 6, it will be seen that that end of the plate 400 which is adjacent the left side of the pin 240 will be found to be of more narrow width forwardly to rearwardly for providing two shoulders 430 disposed one on each side thereof, the shoulders 430 receiving each a spring 436 thereagainst, other ends of the springs 436 engaging the downwardly extending portion 164 of the upper pin hole plate 160 whereby the springs 436 urge the latch 400 to the left in FIGURE 6 in the direction of the arrows 440.

Referring to FIGURE 6, a top plan view of the latch plate and certain associated parts is there shown in which the purpose of having the latch 400 urged in the direction of the arrow 440 will be seen to be more clear.

The opening 410, earlier mentioned, has a circular shape on all sides, excepting for a recess 450 on the right-hand side of FIGURE 6, the recess 450 being concave and having an arch which is substantially that of a portion of the circumference of the inner wall of a circular notch 282 horizontally surrounding the portion 270 of the pin 242.

As best seen in FIGURE 5, the opening 410 is in a position for receiving the largest diametered parts of the portion 270 of the pin 242 whereby the pin 242 can be readily inserted or removed. However, when the latch 400 has moved in the direction of the arrow 440 and into the position shown in FIGURE 5, the recess 450 will then receive the inner wall of the notch 282 of the pin 242 whereby portions of the latch 420 will then be disposed inside the latch-receiving notch 282 of the pin.

Referring to FIGURE 4, it will be seen that the locking plate 80 has a lock opening 700 in it at a place disposed at a substantial spacing above the bolt 94. The lock opening 700 is for receiving a lock dog 710 at times when locking of the plate 80 against pivoting is desired, and it will be seen that prevention of a plate 80 from pivoting will be desired whenever the pin 242 is removed from a pin-receiving assembly 720, which latter can be identified as the upper pin hole plate 60 and all various parts therebelow which surround a pin-receiving chamber 730, best seen in FIGURE 3.

As thus described, at times when the pin 242 is removed from the chamber 730 and from the pin-receiving assembly 720 during the period while an operator is making a delivery, the vehicle 2 cannot be operated because the brake itself, that is, the hand brake 24 will be necessarily set or otherwise it would not have been possible to remove the pin 242, for reasons later described. And also, during the period when the pin 242 is removed, obviously, the seat belt is not then in operative safety condition, and so it is necessary that the vehicle 2 be prevented from operation which is accomplished by a locking of the locking plate 80 by the lock or lock dog 710 in a fashion to prevent movement of the locking plate 80 about its pivot bolt 94 so as to prevent release of the emergency brake 24, and as further later described.

Referring to FIGURE 4, it will be seen that the lock dog or lock 710 is received in a lock housing 740, which latter, as best seen in FIGURE 7, slidably receives the lock dog 710 in a fashion for permitting the lock dog 710 to move either in a direction outwardly toward the left from the housing 740, as indicated by an arrow 750, or inwardly and to the right of the housing 740, as indicated by an arrow 760 in FIGURE 7.

The dog 710 is retained in the housing 740 by means of a pin 780 extending into the lock dog 710 and the lock dog 710 is urged outwardly in the direction of the arrow 750 by a spring 800 partially shown in full lines and partly shown in dotted lines in FIGURE 7.

Again referring to FIGURE 7, it will be seen that the housing 740 pivots on a hinge assembly 820 about a vertical axis and the hinge assembly 820 attaches the horizontally elongated lock dog housing 740 to the right-hand side of the main frame piece 100, whereby at certain times the entire housing 740 is adapted to pivot about the hinge assembly 820 in a fashion for permitting the locking plate 80 to move forwardly in the direction of arrows 850 as is made possible, as best seen in FIGURE 9, by a large lock dog housing opening 860 in the main frame piece 100, the opening 860 being elongated in a horizontal direction sufficiently to permit the left end of the housing 740 and also the lock dog 710 to swing into the opening 860 at times when the housing 740 swings in the direction of an arrow 870 thereby permitting the lock dog 710 to pass within the outlines of the main frame member 100 and out of the way of the forwardly moving locking plate 80 in order to permit forward movement of the locking plate 80 to allow release of the brake 20, as later described.

As best seen in FIGURE 8, the right end of the lock dog housing 740 is provided with a downwardly extending lobe 890, the lobe 890 being engaged at times by a stop 900 in a fashion for stopping movement of the lobe 890 and of its attached housing 740 in the direction of the arrow 870, as seen in the figure.

The stop 700 is preferably in the form of a ring 900 snugly and vertically slidably received around the outside of the post 5, the ring 900 having a horizontally extending stop-catch 904 protruding to the left therefrom and in a position disposed to the rear of the lobe 890 at times when the lock dog 710 is in locking position.

The ring 900 is vertically slidable on the post and is prevented from undue vertical motion by horizontally extending bolts 920 which extend inwardly through the ring 900 and through vertically elongated slots 930 in the post 5, being threadedly received in a pin engageable member 950 which is vertically disposed in the post 5.

As best seen in FIGURE 4, the pin engageable member 950 has a central opening 980 therethrough through which the vertical pin or plunger or extraction plunger 360 is slidably received and a vertically expandable and retractable compression spring 1000 is disposed around the plunger 360 beneath the pin engageable member 950 for urging the pin engageable member 950 into an upper position shown in FIGURE 4 except at times when the pin engageable member 950 is depressed downwardly by being engaged on its upper side by the lower end of the pin 242 at times when the pin 242 is being inserted into the pin receiving chamber 730.

The lower end of the spring 1000 is supported on a limit member 1010 which latter extends across the inner side of the post 5 beneath and engaged by the spring 1000, the limit member being fixed to the post 5 against vertical motion by screws 1020, and the limit member 1010 having a central opening 1012 slidably receiving the plunger 360 therethrough, the plunger 360 having at its lower end the aforedescribed horizontally enlarged lower end 364 which is larger than the opening 1012, whereby upward movement of the plunger 360 is limited by the striking of the limit member 1010 by the enlarged lower end 364 of the plunger.

Also, as earlier described, the spring 370 engages the enlarged lower end 364 of the plunger urging the plunger upwardly, the lower end of the spring 370 being held in fixed position with respect to the post 5 by a spring support 1030 and screws 1032 attaching it to the post 5.

Referring to FIGURE 7, it will be seen that a spring 1050 is attached to the forward side of the lock dog housing 740 and is also attached to the post 5 by eyelet 1052, whereby the spring 1050 tends to urge the lock dog housing 740 into the position for holding the lock dog 710 in locking position with the right-hand end of the lock dog housing 740 forwardly disposed.

Excessive swinging movement of the lock dog housing 740 in the direction of an arrow 1060 is prevented by engagement of the lock dog housing 740 with a rearward wall 1080 of the lock dog housing opening 860 whereby the forwardmost position of the right-hand end of the lock dog housing 740 is approximately transversely of the vehicle 2 and diametrical with respect to the post 5.

The hinge assembly 820 comprises a hinge pin 1300 which is pivotally mounted in a lower support 1310 attached to the main frame piece 100, the upper end of the pin 820 being rotatably mounted in a recess 1320 in the earlier described web 190, as best seen in FIGURE 3.

Referring to FIGURE 4, a pair of sliding tumblers 1400 and 1402 are there shown in position for slidably passing through respective openings 1404 and 1406 in an enlarged upper portion 1420 of the main frame piece 100, the tumblers 1400 and 1402 being known as the upper and lower tumblers respectively and each being further slidably extendable into openings 1430 and 1432 in the blocking plate 80, whereby at times when the plungers are in the position of reception within the plate 80, they tend to lock the plate 80 from any rotation about its bolt 94 with respect to the main frame piece 100.

Innermost ends of the tumblers 1400 and 1402 extend slidably through openings, and the inner ends of the tumblers 1400 and 1402 have wheels 1440 and 1442 mounted thereon for rotation about horizontal axes.

The right-hand ends of the tumblers 1400 and 1402 are represented by the wheels 1440 and 1442, which latter form parts of the tumblers, and such right-hand ends, or such wheels, are respectively engageable with various parts of the outer surfaces of the pin 242 at times when pin 242 is inserted into the pin chamber 730.

Referring to FIGURE 4, it will be seen that the horizontal length of the respective tumblers 1400 and 1402 is different, the upper tumbler 1400 being shorter than the lower tumbler 1402.

At times when the plungers are in the locked position shown in FIGURE 4, although they are urged toward the right by springs 1500, they do not move to the right beyond positions such that enlarged and preferably vertically enlarged left-hand ends 1510 of the plungers are in lapping relationship to the locking plate 80, because of the tents 1520 attached to the plungers and engageable with the tent-engaging members 1530 attached to and extending to the left from the pipe or post 5.

When the plunger 242 is inserted into the plunger-receiving member 730, as best seen in FIGURE 5, the circular annular recess 320 of the plunger will be opposite the right-hand end of the lower tumbler 1402 for causing the lower tumbler 1402 to be urged to the left an amount sufficient to permit its enlarged left-hand end 1510 to be disposed to the left of and clearing of the locking plate 80 to put the tumbler 1402 in a locking plate releasing position, all this assuming the plunger 242 is indeed fully inserted until its inner end engages the plunger-engaging member 950.

Also it will be seen that when the plunger 242 is in the fully inserted position, the inner end of the upper tumbler 1400 will be engaged against the outer jacket 250 of the plunger at a place on the plunger of larger diameter than the inner wall of the recess 320, the position of parts at such times being such that the enlarged left-hand end 1510 of the upper tumbler 1400 is disposed to the left of and clearing the locking plate 80 for release position.

Also, when the plunger 242 is in the fully inserted position, and as best seen in FIGURE 5, the inner end of the lower tumbler 1402 will be disposed in the recess 320 whereby despite the fact that the lower tumbler 1402 has a longer length, the enlarged left-hand end 1510 of the lower tumbler 1402 will, nevertheless, be disposed to the left side of and clearing the locking plate 80 for disposing the plunger 1402 in a release position.

The reasons for freedom of movement of the locking plate 80 are not apparent from FIGURE 5, even though the plungers are shown in release position in FIGURE 5.

However, referring to FIGURE 9, it will be seen that the tumbler openings 1430 and 1432 each have approximately horizontally elongated portions 1570 and 1572, which latter are arcuate each on the arc of part of a circle having its center at the pivot bolt 94. The locking plate 80 is shown in FIGURE 9 in a locking position in full lines, and is shown in FIGURE 9 in dotted lines in the position for release. It will be seen that during movement of the locking plate from the full line to the dotted line release position of FIGURE 9 that the freedom for this movement will be possible, not interfered with by tumblers, because of the elongation of the slot portions the locked full line position shown in FIGURE 9 to the 1570 and 1572.

The direction of movement of the locking plate 80 from the locked full line position shown in FIGURE 9 to the dotted line position shown in FIGURE 9, is indicated by an arrow 1600.

Referring to FIGURE 6, it will be seen that the main portion 420 of the latch plate 400 is provided at its left-hand end with an outwardly protruding roller 1620 mounted on a pin 1622 for horizontal rotation, the roller 1620 being engageable by a ramp 1640, which latter protrudes to the right from and is attached to the locking plate 80, whereby at times when the ramp 1640 is in a rearward position such as shown in FIGURE 6 then the roller 1620 will be opposite the thickest portion 1650 of the ramp 1640 for causing the locking plate or latch plate 400 to be disposed in the right-hand position shown in FIGURE 6 which is actually the left-hand side of the vehicle, whereby the latch plate 400 is in a pin-release or or pin-insertion position.

The ramp 1640 has an inclined surface 1660 on its rearward side for engaging the roller 1620 at times to urge the latch plate 400 in the direction of an arrow 1670 for releasing the pin.

It will be seen that whenever the locking plate 80 is moved forwardly in the direction of an arrow 1690 and toward brake release position, the ramp 1640 will move out of the way allowing the latch 400 to move to the left, as seen in FIGURE 6 under the urging of the springs 436 for release of the pin.

Referring now to FIGURES 1 and 2, it will be seen that when the handle 24 is vertical, as in FIGURE 1, the brake is locked because the emergency brake is controlled by a cable 44 attached by the cable connection member 42 to the bolt 40. The bolt 40 is in an upward position, as seen in FIGURE 1, when the handle 24 is in an upper position, as shown in FIGURE 1.

Conversely, when the handle 24 is in the horizontal or lower position, as shown in FIGURE 2, the bolt 40 is in a lower position in the slot 46, whereby the cable 44 is somewhat released or given slack enough for a downward movement of the cable in the direction of an arrow 1700, shown in FIGURE 2, for permitting the emergency brake to be released.

As earlier described, the various parts of a locking assembly of FIGURE 4 are adapted to prevent horizontal movement of the locking plate 80. Now, I will describe correlation mechanism for preventing the brake handle 24 from moving downwardly to release position only at times when the locking plate 80 is free to move horizontally, whereby the brake cannot be released unless the locking mechanism is unlocked.

The said correlation mechanism is generally indicated at 1720 in FIGURES 1 and 2 and comprises a nib 1722 attached rigidly to and protruding rearwardly from the bifurcated member 30 of the emergency brake assembly, the nib 1722 having a substantially horizontal upper surface 1730 at times when the handle 24 is vertical. The opening 1740 extends horizontally and rearwardly through the brake-hold plate 180, which latter extends transversely of the vehicle.

Referring again to FIGURE 1, it will be seen that as the brake handle 24 moves downwardly in an arcuate pivoting motion in the direction of an arrow 1770, shown in FIGURE 2, by pivoting about the bolt 70, there is a time interval in the forward pressure on the brake handle 24 during which pivoting motion about the bolt 70 is prevented by engagement of the upper surface 1730 of the nib 1722 with the upper wall of the nib opening 1740, whereby during the time interval of this engagement, the only motion that can be defined by the brake handle 24 is a movement in unison with the locking plate 80 with both handle 24 and locking plate 80 pivoting about the bolt 94, whereby an arc of much greater radius is defined as illustrated by an arrow 1780. In this way, the effect of the correlation mechanism 1720 is to cause any forward movement of the upper end of the brake handle 24 to be impossible without the occurrence of a pivoting movement of the upper end of the locking plate 80 forwardly and in the direction of the arrow 1800, shown in FIGURE 1.

In operation, it will be seen that the result of the operation of the correlation mechanism 1720 is that whenever the pin 242 is not in place for causing an unlocking and release of the locking plate 80, the locking plate 80 will, therefore, be fixed and unmovable, thereby making releasing movement of the handle 24 impossible, whereby the vehicle 2 cannot be operated because its emergency brake will be set without a way for it to become unlocked, except through the insertion of the pin 242.

Upon insertion of the pin 242, the locking mechanisms thereby unlock the locking plate 80 permitting pivoting of the locking plate 80, whereby an urging forward of the brake handle 24 will cause the nib 1730 to slide out of its nib opening 1740 whereby the brake handle 24 will be permitted to pivot into the position shown in FIGURE 2, and in such position, the bolt 40 will have been moved downwardly giving the cable 44 slack for releasing the emergency brake, whereby the vehicle 2 is then ready for operation.

Referring to FIGURE 10, a safety belt generally indicated at 200 is there shown having a main portion 205 which is adapted to horizontally surround an operator of the vehicle 2, preferably the belt 200 is provided with a shoulder strap 210 having lower ends attached to the belt 200.

The shoulder strap 210 has for its major purpose to prevent the belt 200 from slipping excessively downwardly upon the operator and for maintaining it in its proper place.

The belt and shoulder strap are preferably made of a suitably strong material such as nylon webbing and have preferably an instantly recognizable color which can be seen from a distance such as, for example, a fluorescent color so as to be easily seen.

On the belt 200 is a steel loop 220 which extends on the inner and outer sides of the belt, the upper end of this steel loop being closed and, in fact, the steel loop 220. The lower ends of the inner and outer portions of the steel loop 220 being provided with openings 224 through which are attached a first link 230 of a chain 232, which latter has another end link 239 connected to the attachment member 240 of the pin 242, earlier described.

As thus described the safety belt lock herein illustrated fulfills the objectives above set forth for operating in the manner defined in the objectives herein and operating in detail by the interrelationships of parts herein set forth.

From the foregoing description, it is thought to be obvious that a safety belt lock constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. In combination: a vehicle having an engine, a key, a belt for attachment about a driver's waist, means attaching said key to said belt, a lock in said vehicle, said lock having a keyhole for receiving said key, said lock having a latch movably mounted therein, said lock, latch and key having operably correlated parts such that at certain times when said key is in said keyhole said key is held in said kehole by said latch, means for anchoring said lock to said vehicle whereby when said key is held in said lock said driver is prevented by said belt and key anchoring means from being ejected from said vehicle, a device having a movable element, said movable element having a first position for vehicle operation and a second position for interfering with vehicle operation, said movable element being so operably correlated with said vehicle that when said movable element is in said second position said vehicle is restrained from normal operation, and means operably correlated with said movable element and said key whereby when said key is in said lock said movable element is permitted to move to said first position for vehicle operation and whereby when said key is not in said lock then said movable element is retained in said second position for interfering with vehicle operation, means operably correlated with said lock and latch for causing said latch to release said key when said movable element is in said second position for interfering with vehicle operation, humanly physically controllable means attached to said movable element for facilitating movement of said movable element between said first and second positions, whereby said driver has an incentive to insert said key into said lock and to operate said humanly physically controllable means in order to place his vehicle in normal operational condition.

2. The combination of claim 1 in which said device having a movable element is an emergency brake of said vehicle.

References Cited by the Examiner

UNITED STATES PATENTS

| 1,211,217 | 1/1917 | Ouellet et al. | 70—254 |
| 1,875,686 | 9/1932 | White | 70—254 |
| 2,660,715 | 11/1953 | Glass et al. | 339—19 |
| 2,725,947 | 12/1955 | Dooley | 180—82 |

KENNETH H. BETTS, *Primary Examiner.*